United States Patent
Chojnacki

(12) 
(10) Patent No.: US 6,173,231 B1
(45) Date of Patent: Jan. 9, 2001

(54) METHOD AND SYSTEM FOR COLLECTING DATA CONCERNING THERMAL PROPERTIES OF ROADS FOR A GEOGRAPHIC DATABASE AND USE THEREOF IN A VEHICLE SAFETY SYSTEM

(75) Inventor: Robert Chojnacki, Chicago, IL (US)

(73) Assignee: Navigation Technologies Corp., Rosemont, IL (US)

( * ) Notice: Under 35 U.S.C. 154(b), the term of this patent shall be extended for 0 days.

(21) Appl. No.: 09/494,579

(22) Filed: Jan. 31, 2000

(51) Int. Cl.[7] .................................................. B60Q 1/00
(52) U.S. Cl. ........................... 701/208; 701/207; 701/25; 340/435; 340/436; 340/580; 340/581; 340/901; 180/167
(58) Field of Search ..................................... 701/208, 207, 701/24, 26, 25; 342/46, 47; 180/167, 168, 169, 170; 340/435, 580, 581, 601, 602, 901, 436

(56) References Cited

U.S. PATENT DOCUMENTS

| | | | |
|---|---|---|---|
| 5,416,476 | 5/1995 | Rendon | 340/905 |
| 5,774,070 | 6/1998 | Rendon | 340/905 |
| 5,963,148 | 10/1999 | Sekine et al. | |
| 5,982,278 | * 11/1999 | Cuvelier | 340/436 |

FOREIGN PATENT DOCUMENTS

19816004 A1   10/1999 (DE) .

* cited by examiner

Primary Examiner—William A. Cuchlinski, Jr.
Assistant Examiner—Yonel Beaulieu
(74) Attorney, Agent, or Firm—Frank J. Kozak; Lawrence M. Kaplan

(57) ABSTRACT

A method and system of collecting data concerning thermal properties of roads and using the collected data to form a geographic database that can be used in a vehicle safety system to implement a safety process when the vehicle approaches a location of a potential ice hazard. Data indicative of the thermal properties of roads are collected by driving along roads in a vehicle equipped with equipment that senses thermal properties of the roads upon which the vehicle is being driven. Using the collected data, a geographic database is formed that relates positions along roads to thermal properties of the roads at the positions. A vehicle safety system uses the geographic database, a positioning system that determines a position of the end user's vehicle along the roads represented by the geographic database, and an ice hazard application to implement a safety procedure when the vehicle approaches a location at which a potential ice hazard

28 Claims, 6 Drawing Sheets

METHOD AND SYSTEM FOR COLLECTING DATA CONCERNING THERMAL PROPERTIES OF ROADS FOR A GEOGRAPHIC DATABASE AND USE THEREOF IN A VEHICLE SAFETY SYSTEM

BACKGROUND OF THE INVENTION

The present invention relates to a process and system for collecting data about thermal properties of roads located in a geographic area and using the collected data to form a database and also relates to a vehicle safety system that uses the database to implement a safety process when a vehicle approaches a location of a potential ice hazard.

Various safety systems have been developed for vehicles, such as automobiles, using technologies that sense the area around the vehicle. Examples of some of these safety systems for vehicles include adaptive cruise control, obstacle warning, curve warning, intersection warning, lane departure warning, collision warning, and adaptive transmission shift control. The adaptive cruise control system maintains and/or resumes a set speed or safe following distance from other vehicles at slower than the set speed based on data about vehicle speed, nearby vehicles and other obstructions, type of road being traveled (motorway vs. local road), road curvature, tilt, elevation, and other factors. The obstacle warning system detects objects around the vehicle and provides warnings about the obstacles to the vehicle driver. The curve warning system detects upcoming curves along the vehicle path and provides warnings to the vehicle driver if the vehicle speed is excessive given the road conditions. The intersection warning system detects upcoming intersections along the vehicle path and provides warnings to the driver, if appropriate. The lane departure warning system detects when the vehicle has departed from a lane and provides warnings to the driver as appropriate. The adaptive shift system control adjusts the gearing and shifting of automatic transmissions based on sensor data about vehicle speed, engine speed, road curvature, tilt, elevation, and other factors.

One relatively new safety system that has been considered is an ice hazard warning system. The ice hazard warning system uses sensors to detect the presence of ice on a road and, if ice is detected, provides the driver with a warning.

Although an ice hazard warning system would be useful, such a system would have limitations. For example, such an ice hazard warning system would have a limited range of detection for ice. A vehicle may encounter a patch of ice along a road before the ice hazard warning system is able to provide a warning. Even if the ice hazard warning system is able to provide a warning before the vehicle encounters a patch of ice, the vehicle may be traveling at a speed such that the ice is encountered before the driver is able to slow down. Accordingly, it would be useful if a driver could be warned about ice hazards sufficiently in advance so that appropriate precautions can be taken, e.g., slow down.

SUMMARY OF THE INVENTION

To address these and other objectives, the present invention comprises a method and system of collecting data concerning thermal properties of roads and using the collected data to form a geographic database that can be used in a vehicle safety system to implement a safety process when the vehicle approaches a location of a potential ice hazard. Data indicative of the thermal properties of roads are collected by driving along roads in a vehicle equipped with sensor equipment that senses a thermal property of the road upon which the vehicle is being driven. Using the collected data, a geographic database is formed that relates positions along roads to thermal properties of the roads at the positions. According to a further aspect, a vehicle safety system uses the geographic database containing data about the thermal properties, a positioning system that determines a position of the end user's vehicle along the roads represented by the geographic database, and an ice hazard application to implement a safety procedure when the end user's vehicle approaches a location at which a thermal property of the road indicates a potential ice hazard.

DETAILED DESCRIPTION OF THE PRESENTLY PREFERRED EMBODIMENTS

I. Overview

Figure 1:
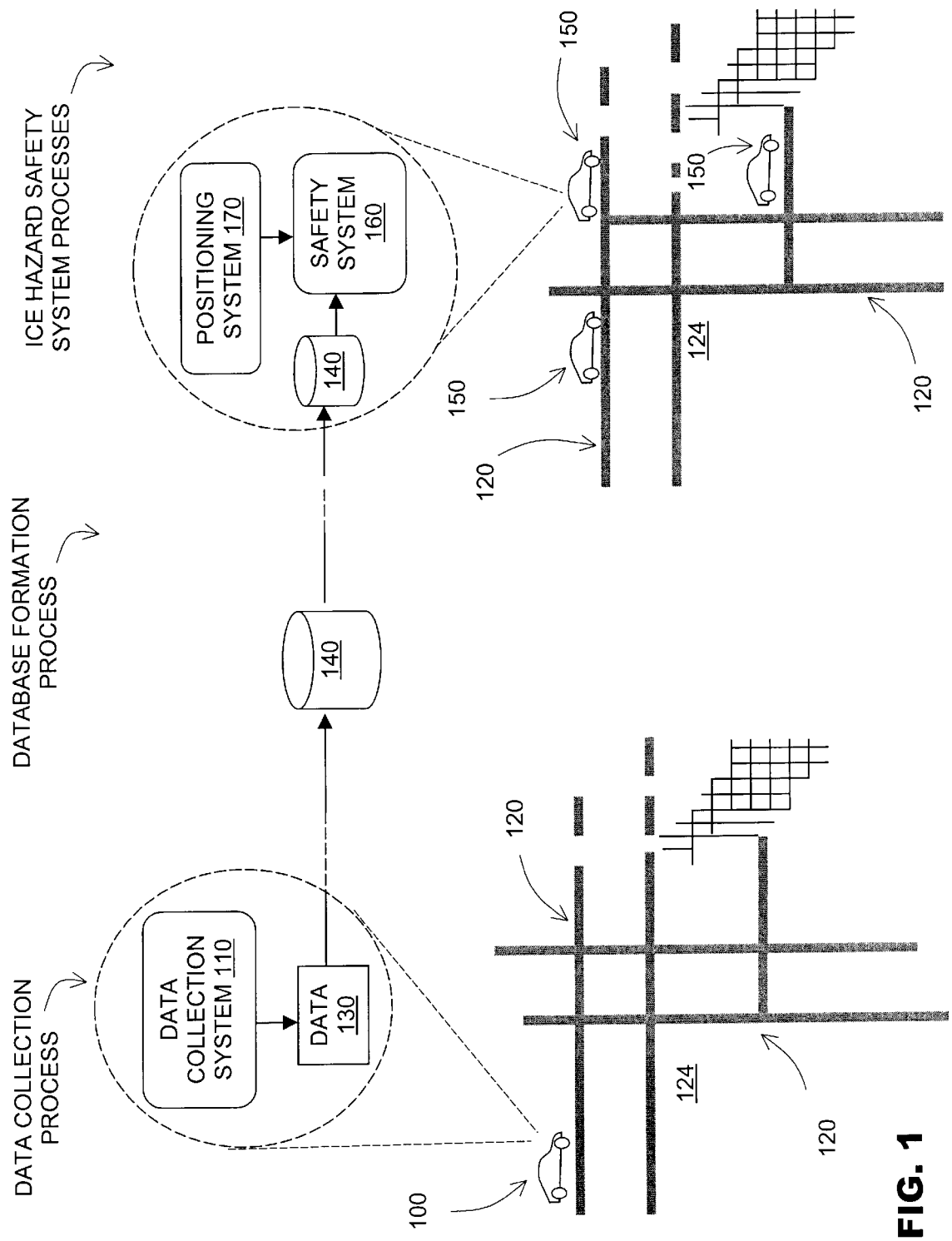
FIG. 1 is a diagram illustrating an overview of different aspects of the disclosed systems and methods.

FIG. 1 illustrates an overview of three processes. The three processes include data collection, database formation, and use of the database in safety systems in end users' vehicles.

In the data collection process, a vehicle 100 equipped with a data collection system 110 travels along roads 120 in a geographic area 124. The data collection system 110 collects data 130 about the roads 120, including data about thermal properties of the roads 120. In the database formation process, the collected data 130 is used to form a geographic database 140.

End users' vehicles 150 include safety systems 160 that use copies of the geographic database 140. The safety systems 160 implement safety procedures when potential ice hazards are being approached. Each of the end user's vehicles 150 includes a positioning system 170 by which the location of the vehicle 150 along a road 120 can be determined. Based on the location of the vehicle 150 along a road, as determined by the positioning system 170 and the data in the geographic database 140, the safety system 160 implements a procedure when the vehicle approaches a location of a potential ice hazard.

Each of the different aspects of FIG. 1 is discussed in more detail below.

The disclosed embodiments are premised, in part, on the recognition that the formation of ice hazards along roads is related to one or more measurable properties. These properties can be used to predict whether ice is potentially present on a portion of a road. For example, it is well known that ice forms more quickly on bridges. However, the exact location at which ice tends to be present on a bridge cannot easily be determined by visual inspection of the bridge or the road. The tendency for ice to form along a road is related to a combination of factors. These factors may include the thermal conductivity of the road and the composition of the road (e.g., concrete, asphalt, gravel, etc.). Factors that affect the formation of ice may also include geological factors, such as the proximity of the road surface to a sufficiently large mass, e.g., the ground, that may serve as a heat reservoir. Another factor that may affect the formation of ice along a road is the exposure of the road, e.g., is the road shaded by trees or buildings, is the road along a mountainside, etc. Factors may also include climatological factors, such as prevailing winds, humidity, etc. The embodiments disclosed herein provide a more reliable and less expensive way to determine the properties of roads from which potential ice hazards can be determined.

II. Collection of Road Data

A. First Embodiment.

Figure 2:
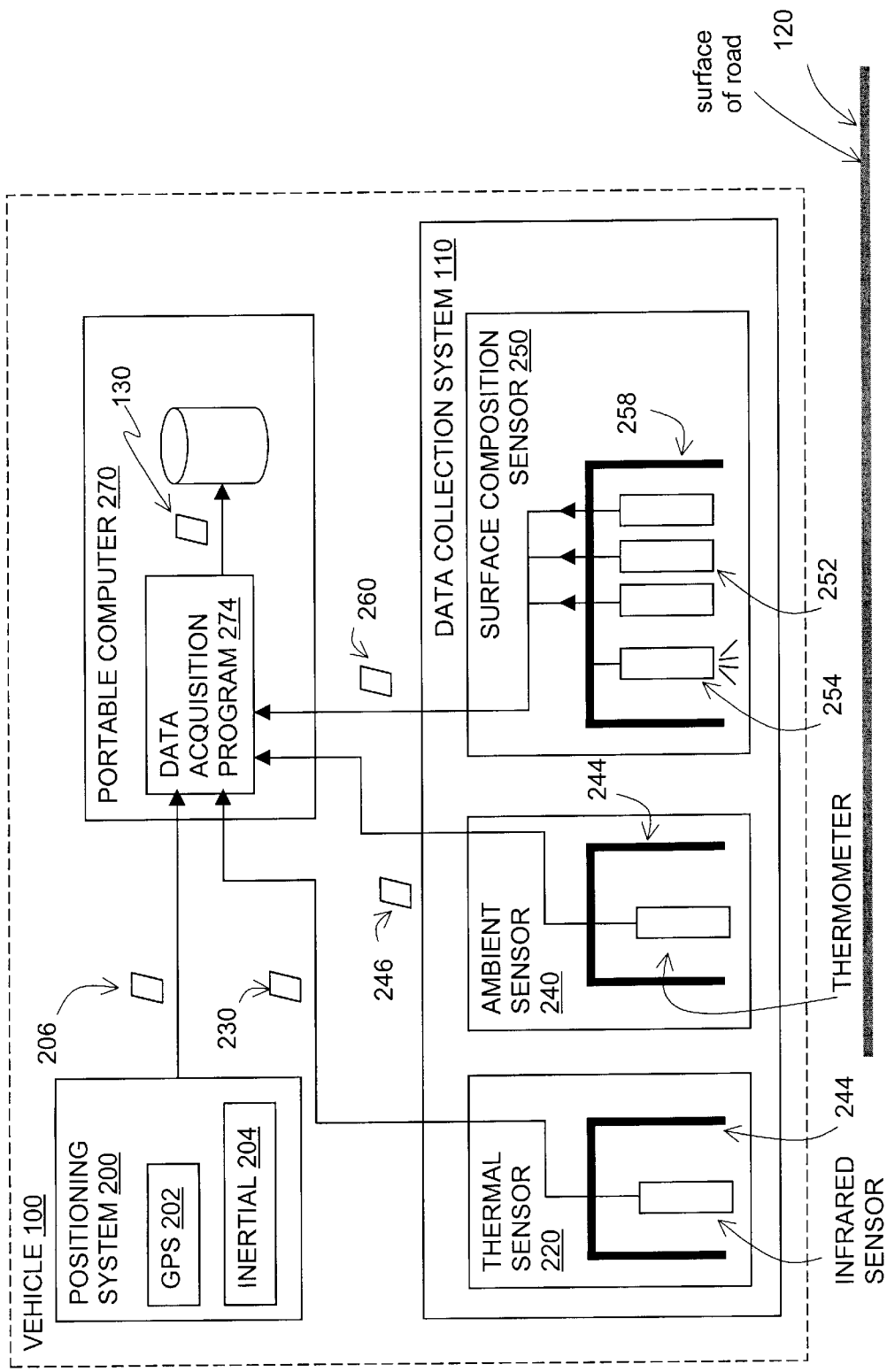
FIG. 2 is a diagram illustrating the data collection process of FIG. 1.

FIG. 2 shows the data collection process of FIG. 1. The vehicle 100 includes the data collection system 110 that is used to collect data 130 about the roads 120. Included in the vehicle 100 is a positioning system 200. The positioning system 200 may be part of the data collection system 110 or may be a separate component. The positioning system 200 is used to determine the location of the vehicle 100 as the vehicle travels along the roads. The positioning system 200 provides an output 206 indicative of the location of the vehicle 100.

The positioning system 200 may use any of various technologies to determine a position of the vehicle 100. For example, the positioning system 200 may include a GPS receiver 202 by which the position of the vehicle 100 can be determined. Alternatively, the positioning system 200 may include other types of sensors 204 (such as inertial sensors) by which the location of the vehicle 100 can be determined by dead reckoning. Alternatively, the positioning system 200 may include a combination of GPS and other types of sensors.

The data collection system 110 also includes one or more sensors. In this embodiment, the data collection system 110 includes a road surface temperature (or first) sensor 220. The road surface temperature sensor 220 senses the temperature of the surface of the road over which the vehicle 100 is traveling. In one embodiment, the road surface temperature sensor 220 is an infrared sensor. The road surface temperature sensor 220 is oriented downward so that it is responsive to the temperature of the surface of the road beneath the vehicle. The road surface temperature sensor 220 is surrounded by a hood or shield 224. The hood 224 surrounds all or at least part of the sides and top of the road surface temperature sensor 220. The hood 224 is composed of an insulative material so as to reduce the effects upon the road surface temperature sensor 220 from directions other than the surface of the road. The road surface temperature sensor 220 provides an output 230. The output 230 is indicative of the temperature of the surface of the road beneath the vehicle. The output 230 may be analog or digital. If the output 230 is analog, it is provided to an A/D converter that samples the signal and provides a digital output indicative thereof.

In this embodiment, the data collection system 110 also includes an ambient air temperature (or second) sensor 240. The ambient air temperature sensor 240 senses the temperature of the air around the vehicle 100. In one embodiment, the ambient air temperature sensor 240 is a thermometer. The ambient air temperature sensor 240 is oriented so that it is responsive to the temperature of the air around the vehicle 100. The ambient air temperature sensor 240 may be surrounded by a hood or shield 244 that reduces interference from the vehicle engine, exhaust, direct sunlight, etc. The ambient air temperature sensor 240 provides an output 246. The output 246 is indicative of the ambient air temperature around the vehicle. The output 246 may be analog or digital. If the output 246 is analog, it is provided to an A/D converter that samples the signal and provides a digital output indicative thereof.

In the embodiment of FIG. 2, the data collection system 110 also includes a road surface composition (or third) sensor 250. The road surface composition sensor 250 senses properties from which the composition of the surface of the road 120 upon which the vehicle 100 is traveling can be determined. In one embodiment, the road surface composition sensor 250 is comprised of a light 254 and three LED's 252. One of the LED's is responsive to blue, another to red, and the third to green. The light 254 is oriented to shine on the road surface 120 beneath the vehicle 100. The LED's 252 measure the amount (or intensity) of each of the three colors of light reflected back from the road surface. The road surface composition sensor 250 may be surrounded by a hood 258 that reduces the interference from outside sources. The road surface composition sensor 250 provides an output 260. In one embodiment, the output 260 includes three components indicative of the amount of reflection of each of the three colors from the road surface. (Instead of colored LED's, any other kind of color sensors can be used or alternatively color filters can be used.) If the output 260 is not digital, it can be provided to a converter that provides a digital output indicative thereof.

Also included in the vehicle 100 is a computer 270. In one embodiment, the computer 270 is a portable personal computer. The output 206 of the positioning system 200 and the outputs 230, 246, and 260 of the road surface temperature sensor 220, the ambient air temperature sensor 240, and the road surface composition sensor 250, respectively, are provided to an interface of the portable computer 270. Installed on the computer 270 is a data processing program 274. The data processing program 274 handles the receipt of the data outputs from the positioning system 200 and the sensors 220, 240, and 250. The data processing program 274 also handles the storage of these data on a data storage device. In one embodiment, the data storage device is the hard drive of the personal computer 270.

The data collection processes includes driving the vehicle 100 with the data collection system 110 along the roads 120 for which data concerning the thermal properties of the roads are to be obtained. The vehicle 100 is driven by a person (referred to as a "researcher") who works for a data collection company. The driver may be accompanied by another person who assists in acquiring the data.

Figure 3:
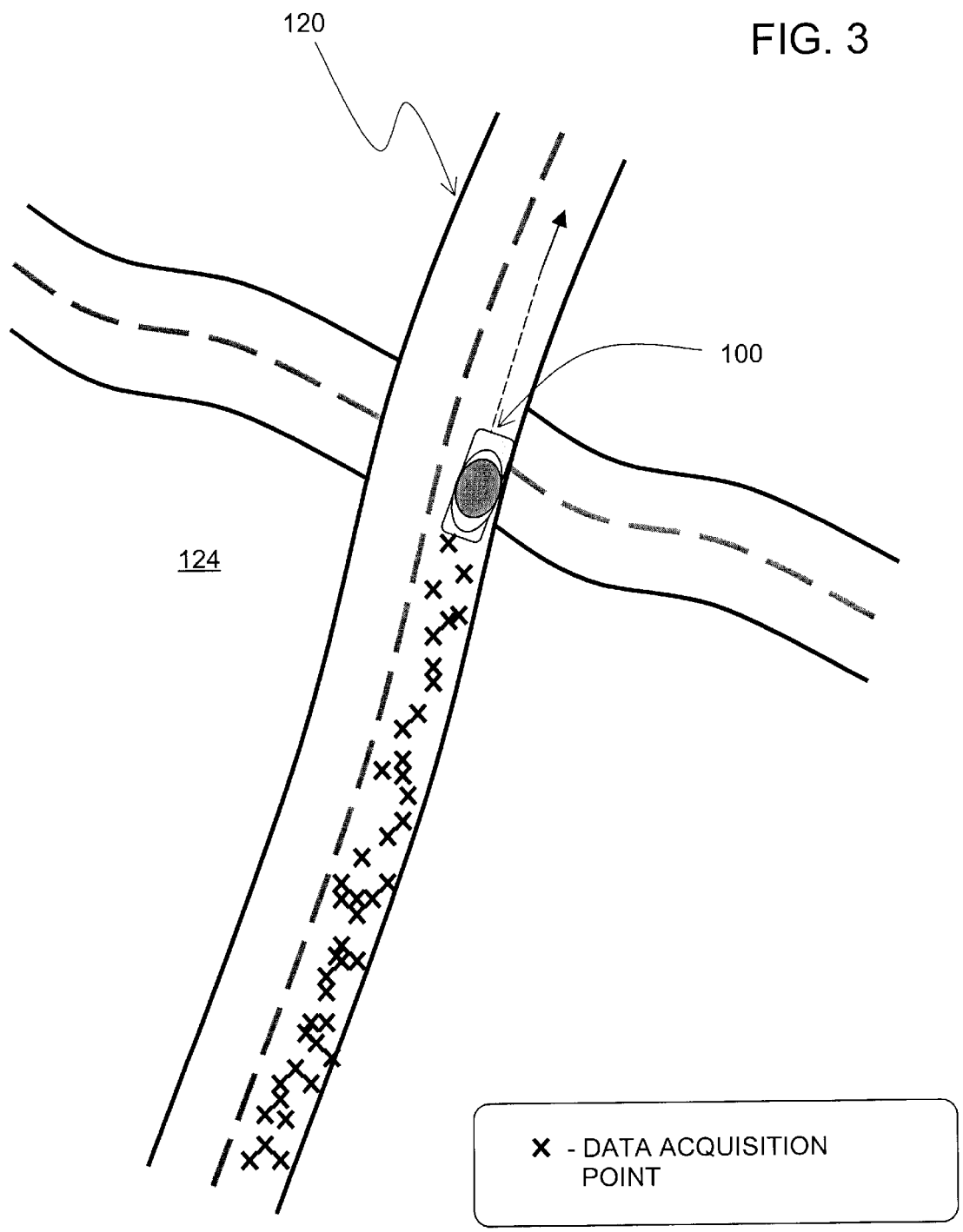
FIG. 3 is an illustration of road upon which is the data collection vehicle 100 of FIG. 1 is being driven.

Referring to FIG. 3, the vehicle 100 is shown being driven along road 120 for which data about which thermal properties are to be acquired. As the vehicle 100 is being driven along the roads 120, the data processing program 274 on the personal computer 270 in the vehicle 100 acquires the data output by the positioning system 200 and the sensors 220, 230, and 250. The positioning system 200 and the sensors 220, 240, and 250 may output data at regular or irregular intervals. Also, the positioning system 200 and the sensors 220, 230, and 250 may output data at different rates. The data processing program 274 acquires the raw data from the different components and stores the raw data. Each item of data that is stored by the data processing program 274 is associated with a time stamp, or other means of chronological identification, that indicates when the data had been acquired.

Figure 4:
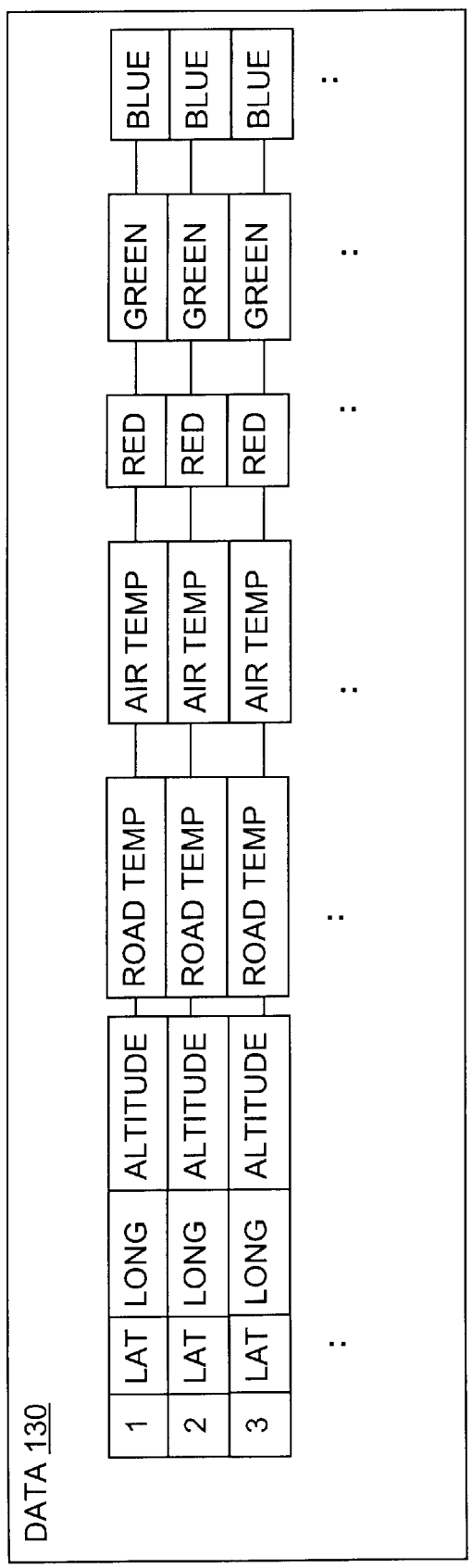
FIG. 4 is a diagram showing the kinds of data that are collected by the data collection system of FIG. 2.

FIG. 3 shows a plurality of positions, labeled with X's, extending along the road 120 upon which the vehicle 100 is being driven. Each of the labeled positions corresponds to an acquisition of data by the data processing program 274 from the positioning system 220 indicating the position of the vehicle 100 as the vehicle 100 is driven along the road 120. The outputs 230, 246, and 260 of the sensors are associated with the output 206 of the positioning system 220 so that the locations at which the outputs 230, 246, and 260 were obtained are stored. FIG. 4 illustrates the storage of data by the data processing program 274.

The collection of data about the thermal properties of roads may be carried out by several vehicles that are driven along the roads in a geographic area or alternatively the collection of data may be carried out by a single vehicle. Data about the thermal properties of roads may be collected for all the roads in a geographic area or alternatively, the data may be collected for only some of the roads. The amount of time needed to drive along the roads in a geographic area depends upon the size of the area, the number of vehicles, and the percentage of all the roads for which data coverage is desired. After the data 130 have been collected, the data are forwarded to a central location at which the database formation process is performed.

It is noted that various environmental conditions should be taken into account when collecting data concerning the thermal properties of roads. For example, it may be preferable that the collection of thermal data be undertaken when the difference between the temperature of the air and the temperature of the road surface is greatest. It may be preferable that the data be collected after a sudden and/or significant temperature change. Also, it may be preferable that the data be collected at certain times of day in order to observe larger temperature differences between the air temperature and the temperature of the road surface. It may also be preferable that the air temperature be within a certain range.

The collection of data concerning the thermal properties of roads may be combined with the collection of data about other properties or features of the roads or about other types of geographic features. For example, the collection of data concerning the thermal properties of roads can be carried out while collecting data about the road locations, road curvature, speed limits along roads, street names, addresses and address ranges, the presence of lane dividers, number of lanes, turn signals, the presence and types of signs located along roads, and so on. Methods for collecting data about roads are disclosed in U.S. Pat. No. 5,999,878 and U.S. patent applications Ser. Nos. 09/256,389, 09/335,122, 09/426,036, and 09/426,341, the entire disclosures of which are incorporated by reference herein.

III. Formation of Geographic Database

Figure 5:
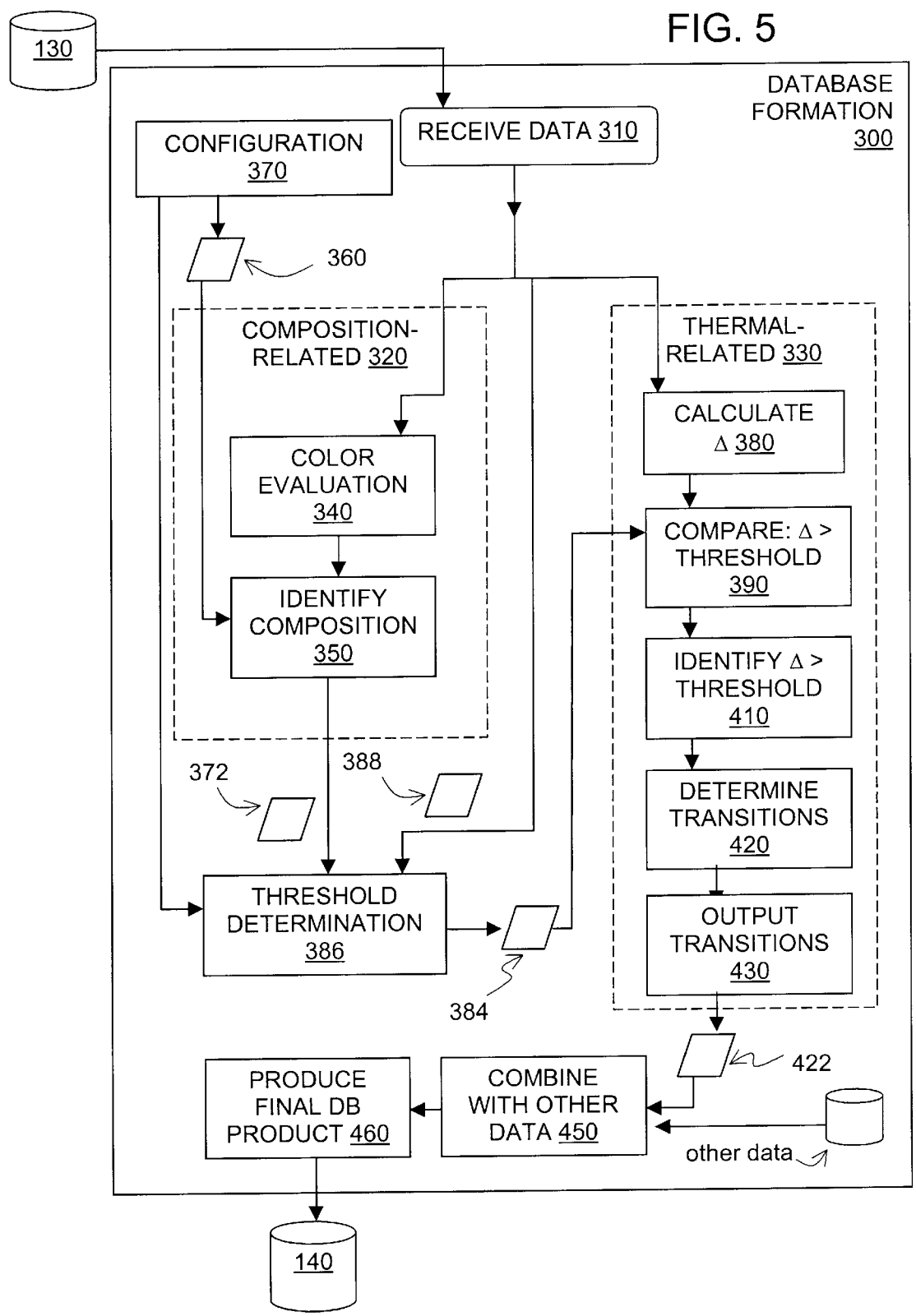
FIG. 5 is a flow chart showing the geographic database formation process of FIG. 1.

FIG. 5 shows the steps involved in a database formation process 300. The database formation process 300 uses the data 130 representing the thermal properties of roads that had been collected using the data collection system 110. The database formation process 300 is performed at the central location to which all the data that had been collected are sent. The process 300 includes a step 310 in which the collected data 130 are received. Following the step 310 of receiving the collected data 130, one part 320 of the process 300 relates to determination of the road composition and another part 330 relates to determination of the thermal differential of the represented roads.

In the part 320 of the process 300 that relates to road composition, the collected data identifying the intensities of the different colors (from the data 130) are evaluated (Step 340). For each location at which the intensities of the different colors were obtained, a process attempts to identify the composition of the road (Step 350). The process compares the color intensity data at that location to parameters 360. The parameters 360 are provided by a configuration process 370 in which various color intensities are compared to known composition types (e.g., concrete, asphalt, gravel, and so on). Based on the comparison to the parameters 360, the composition of the road at each location is determined or estimated. Data 372 indicating the composition is provided as an output.

Meanwhile, in the part 330 of the process 300 that relates to thermal differential, the collected data identifying the road temperature and the ambient temperature are evaluated. For each location at which data identifying the road temperature and the ambient temperature were obtained, a temperature difference (e.g., $\Delta$) is calculated (Step 380). This difference is used as an indication of the thermal differential of the road, i.e., the greater the difference, the higher the differential. This difference is compared to a threshold 384 (Step 390). In one embodiment, the threshold 384 is a constant that is based on previously obtained data about the relationship between the occurrence of ice hazards and the thermal differential. In another alternative, the threshold 384 is calculated by a threshold determination process or program 386. The threshold determination program 386 can take into account various factors in order to determine a value for the threshold at a specific location. Included among the factors that are used by the threshold determination program 386 are the composition of the road at the location and the ambient temperature 388 at the location. Additional factors may be used. The threshold determination program 386 can be configured to weigh the various factors. The weightings may be developed using comparisons to roads where ice hazards are known to occur.

Regardless of how the threshold 384 was determined, those locations at which the temperature difference exceeds the threshold are identified (Step 410). Then, transition locations are identified (Step 420). Transition locations are the locations at which the temperature difference first began to exceed the threshold and the locations at which the temperature difference no longer exceed the threshold. Data 422 representing the transition locations and the transition direction (e.g., non-ice hazard to ice hazard or ice hazard to non-ice hazard) are identified for inclusion in the geographic database 140 which will be used by the in-vehicle ice hazard safety system, as explained below (Step 430).

The vehicle in which the geographic database 140 will be used may include other safety systems that use geographic data. Some of these other systems may include adaptive cruise control, obstacle warning, curve warning, intersection warning, lane departure warning, collision warning, and adaptive transmission shift control as well as other systems. Some of these other safety systems may use the same types of geographic data which are used by the ice hazard safety system, but other safety systems may use different types of geographic data. It may be necessary or efficient that the ice hazard safety system and one or more of these other safety systems use the same geographic database. If the geographic database 140 to be used by the ice hazard safety system will also be used by one or more other safety systems that require additional types of data, the data needed for the ice hazard system are combined with the data required by the other safety system(s) (Step 450). A final database product 140 is then produced that supports all the safety systems in the vehicle that uses the geographic data (Step 460).

(In an alternative embodiment, each safety system may be supported by its own geographic database, in which case the geographic database used by the ice hazard safety system would include only the data needed to support the ice hazard safety system features.)

The vehicle with the ice hazard safety system that uses the geographic database 140 may also include a navigation system that uses geographic data. Some of the types of geographic data used by the navigation system may be the same as the geographic data used by the ice hazard safety system although the navigation system requires other types of geographic data as well. It may be efficient that the ice hazard safety system and the navigation system use the same geographic database. If the geographic database is to be used by both the ice hazard safety system and a navigation system, the data identified as needed for the ice hazard system are preferably combined with the data required by the navigation system. A final database product is produced that supports the ice hazard system, the navigation system, and possibly other safety systems.

USE OF THE DATA BY A VEHICLE SAFETY SYSTEM

Figure 6:
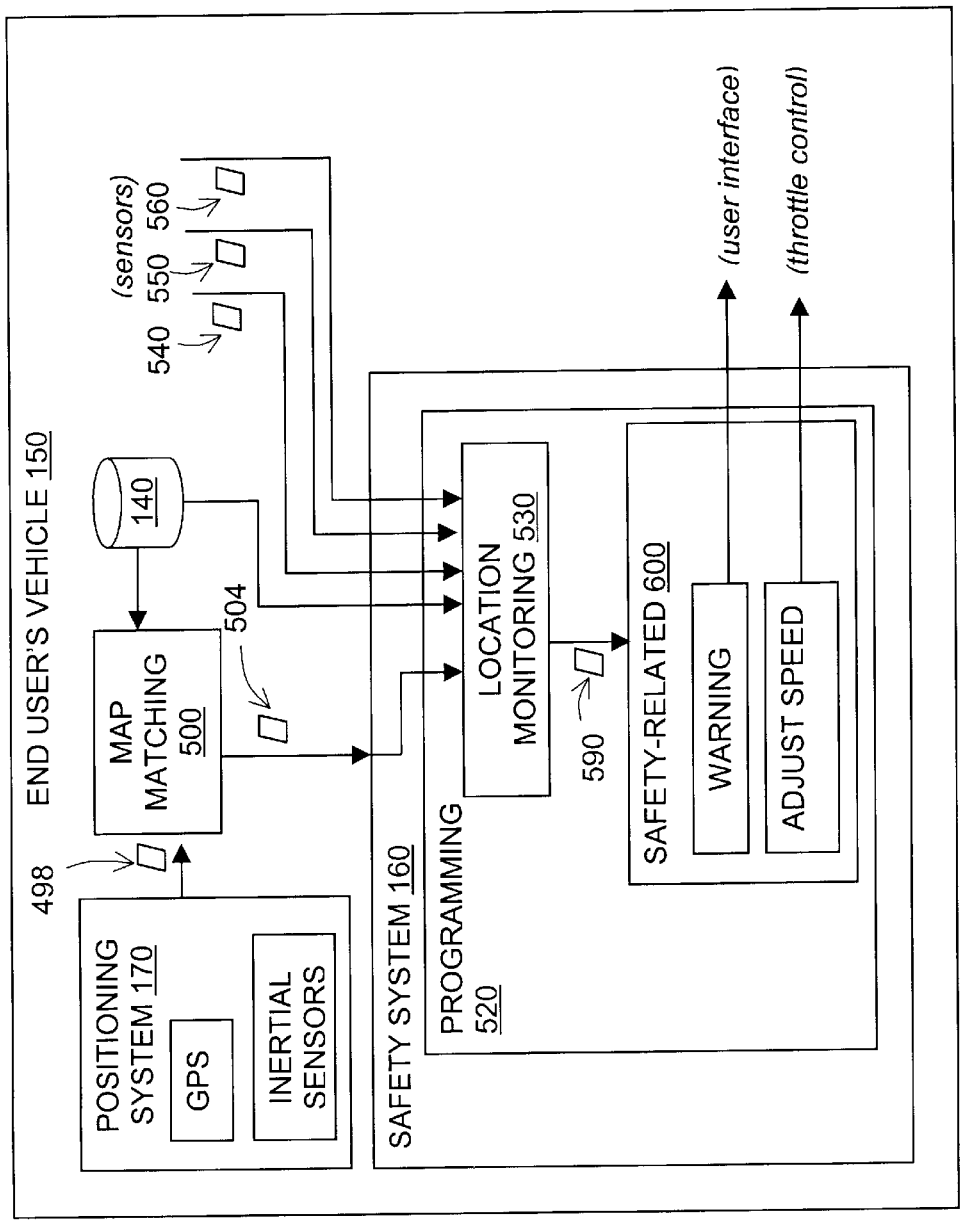
FIG. 6 is a block diagram of the vehicle safety system in the end user's vehicle shown in FIG. 1.

FIG. 6 shows a diagram of the vehicle ice hazard safety system 160 installed in the end user's vehicle 150. The in-vehicle ice hazard safety system 160 uses a copy of the geographic database 140 that contains the data about thermal properties of roads. The in-vehicle ice hazard safety system 160 uses a positioning system 170 which is used to determine a position of the vehicle 150. The positioning system 170 may utilize GPS, dead reckoning, or a combination of GPS and dead reckoning, or any other type of positioning technology. The output 498 of the positioning system 170 is provided to a matching program 500. The map matching program 500 relates the position of the vehicle 150, as determined by the positioning system 170, to a location along a road represented by data in the geographic database 140. The map matching program 500 provides an output 504 indicating the current location of the vehicle relative to a road represented by data in the geographic database 140. (In one embodiment, the geographic database 140, the ice hazard safety system 160, the positioning system 170, the map matching program 500, and the safety programming 520 are physically located in the vehicle 150. In alternative embodiments, one or more of these components may be located remotely from the vehicle 150 and may communicate other components in the vehicle by means of a wireless communications link.)

The in-vehicle ice hazard safety system 160 includes programming 520 that implements the safety features of the system 160. The programming 520 includes a location monitoring routine 530. The location monitoring routine 530 receives the output 504 from the map matching program 500. The location monitoring routine 530 also receives data 540 indicating the vehicle speed, data 550 indicating the vehicle heading, and data 560 indicating the ambient air temperature. The data 540 indicating the vehicle speed may be obtained from an appropriate sensor, such as a speed pulse sensor. The data 550 indicating the vehicle heading may be obtained from another sensor (such as a compass), or may be obtained from the positioning system 170, e.g., using dead reckoning. The data 560 indicating the ambient air temperature may be obtained from an appropriate sensor, such as a thermometer. The programming 520 uses the data provided to it to relate the vehicle location, speed and heading to locations along the roads at which ice hazards potentially exist. The locations at which ice hazards potentially exist are determined using the data indicating the air temperature 560 and data indicating the thermal properties of locations along the roads from the geographic database 140. Using these inputs, the location monitoring routine 530 determines whether the vehicle 150 is within a predetermined time and/or distance from a location of a potential ice hazard, and if it is, the location monitoring routine 530 provides an output 590 that implements a safety-related routine 600.

The safety-related routine 600 can implement one or more processes. In one embodiment, the safety-related routine 600 provides a visual and/or audible warning to the driver that the vehicle is approaching a location of a potential ice hazard. In another embodiment, the safety-related routine 600 automatically adjusts the vehicle speed so that it is traveling at a safe speed in case there is ice on the road ahead (e.g., the routine 600 automatically slows down the vehicle to a safe speed if the vehicle is traveling too fast). In another embodiment, the routine 600 both provides a warning and adjusts the vehicle speed. According to yet another embodiment, the routine 600 enables the anti-lock braking functions regardless of whether the brake pedal is pressed.

The ice hazard safety system 160 can be used with sensors that attempt to detect the presence of ice. If the ice hazard system 160 includes ice detection sensors, warnings can be provided both for the actual detection of ice as well as when areas of potential ice hazards are being approached.

V. Alternatives

In the embodiments described above, it was stated that data concerning the thermal properties of roads were collected by a researcher in a vehicle in which a data collection system was installed. In an alternative embodiment, the data concerning the thermal properties of roads may be collected by someone other than a researcher. For example, end users' vehicles can be used to collect data concerning the thermal properties of roads. The end user may be a commercial user (e.g., a taxi cab driver or a deliver) truck driver) or alternatively, the end user may be a non-commercial user. According this alternative, a data storage system in the end user's vehicle operates to collect the data concerning the thermal properties of roads as the vehicle is being driven along roads by the end user in the same manner as in the embodiment described above in which the researcher was driving the vehicle. The data storage system may be located in the end user's vehicle or may be located remotely. If the data storage system is located remotely, the vehicle position data and thermal property data are transmitted by a wireless communication system to the remote location at which the data storage system is located. In this embodiment, once the data concerning the thermal properties of roads are acquired, they are processed in a manner similar to the manner described above. When data concerning the thermal properties of roads are acquired by an end user's vehicle, a verification process may be used to check the validity of the data (for example, to check whether the data had been acquired when there is a sufficient difference between the temperature of the road and the air temperature). When data concerning the thermal properties of roads are acquired by end users' vehicles, a statistical analysis process may be used to refine the data. A method for acquiring data using end users' vehicles is described in U.S. Pat. No. 6,047,234, the entire disclosure of which is incorporated herein by reference.

In the embodiments described above, it was stated that data concerning the thermal properties of roads were collected while driving a vehicle with a data collection system along roads in a geographic area. In an alternative embodiment, the data concerning the thermal properties of roads can be collected by aerial sensing. For example, the thermal properties of roads can be collected by a sensor system in an airplane, a satellite, a balloon, a helicopter, and so on. Once the data about the thermal properties of roads are collected using aerial sensing, the properties are related to data indicating positions along the roads and used to form a geographic database, as described above.

In the embodiments described above, a geographic database containing data about the thermal properties of roads is used by the vehicle safety systems installed in end users' vehicles to implement safety procedures when potential ice hazard is being approached. In the embodiments described above, the geographic database was described as being located in the end user's vehicle. In alternative embodiments, the geographic database containing data about the thermal properties of roads may be located outside the end user's vehicle. For example, the geographic database containing data about the thermal properties of roads may be located remotely, e.g., on a server. In this alternative, the safety system in the end user's vehicle communicates with the remotely located database using a wireless communications system.

In the embodiments described above, it was stated that each of the end users' vehicles includes a positioning system by which the location of the end user's vehicle along a road can be determined. In an alternative embodiment, the location of an end user's vehicle can be determined by a system located external of the end user's vehicle. For example, the location of an end user's vehicle can be determined using any of the technologies that are used to determine the positions of cellular phones (or other types of wireless phones) in an area. Some of the companies that provide this type of technology include ArrayComm, Inc., Harris Corporation, Corsair Communications, Lockheed Martin Corporation, CELLTRAX, Inc., TruePosition, Inc., Cell-Loc Inc., KSI Inc., and U.S. Wireless Corporation. For example, some of these technologies are used to locate a cellular phone user who dials an emergency number, e.g., "911." Any such technology that is presently available or that becomes available in the future may be suitable. If the ice hazard system in an end user's vehicle uses an external system to determine the location of the end user's vehicle, data indicating the end user's vehicle location is compared to locations of potential ice hazards using the database containing the information about the thermal properties of roads. The database may be located in the end user's vehicle or may be located remotely, as described above. Based on this comparison, an appropriate procedure is implemented in the end user's vehicle when the location of an ice hazard is being approached.

In an embodiment described above, it was stated that a difference between the temperature of the road surface and the ambient temperature at a given location was determined at a central location during the database formation process. In an alternative embodiment, the difference between the temperature of the road surface and the ambient temperature can be determined in the vehicle as part of the data collection process. According to this alternative, the temperature difference is calculated in the data collection vehicle as the data are being acquired and data indicating the temperature difference is stored in the data storage device located in the data collection vehicle.

In an embodiment described above, it was stated that the road composition at a given location was determined at a central location during the database formation process. In an alternative embodiment, the road composition can be determined in the vehicle as part of the data collection process. According to this alternative, the road composition is calculated in the data collection vehicle as the data are being acquired and data indicating the road composition is stored in the data storage device located in the data collection vehicle.

For purposes of this specification, thermal properties of roads include thermal conductivity, road composition, temperature, and temperature differences. Thermal properties of roads can take into account geological, climatological, geographic, and other conditions. Thermal properties of roads can also include data indicating that an ice hazard has a tendency to form on a road surface. Data indicating this tendency can be expressed with a single logical bit, e.g., the tendency for ice to form at a given location is present or not present. Data indicating this tendency can also be expressed as transitions at indicated locations, e.g., a logical bit indicating that the road surface at a given location changes from having no tendency to having a tendency, or vice versa.

The data processing program 274, the threshold determination program 386, the map matching program 500, and the programming 520 that implements the safety features of the system 160 may be written in any suitable programming language, such as C, C++, Java, Visual Basic, and so on.

VI. Advantages

The present system and method provide for collecting data concerning the thermal properties of roads for geographic data efficiently and quickly. The disclosed embodiments also describe the formation of a geographic database containing data concerning the thermal properties of roads. The disclosed embodiments also disclose a safety system that can be installed in a vehicle (or used in a vehicle) and that implemements a process when a potential ice hazard is being approached. The disclosed embodiments also describe how an ice hazard safety system can be integrated with other types of safety systems or with a navigation system.

It is intended that the foregoing detailed description be regarded as illustrative rather than limiting and that it is understood that the following claims including all equivalents are intended to define the scope of the invention.

I claim:

1. A method of collecting data concerning ice hazards for a geographic database comprising:

operating sensor equipment responsive to a thermal property of a road surface to collect data from which potential ice hazards along roads are determined;

associating said data from which potential ice hazards are determined with data indicative of locations along said roads; and storing said data from which potential ice hazards are determined with said data indicative of locations along said roads.

2. The method of claim 1 further comprising:

driving a vehicle along said roads in a geographic area, wherein said vehicle is equipped with said sensor equipment, and wherein said data from which potential ice hazards along roads are determined are collected while said vehicle is being driven along said roads.

3. The method of claim 2 wherein said sensor equipment comprises a road surface sensor and wherein said method further comprises:

operating said road surface sensor to collect data indicative of a temperature of said portion of the road over which said vehicle is being driven.

4. The method of claim 3 wherein said sensor equipment comprises an air sensor and wherein said method further comprises:

operating said air sensor to collect data indicative of an ambient temperature around said vehicle.

5. The method of claim 4 further comprising:

storing said data indicative of said temperature of said portion of the road over which said vehicle is being driven and said data indicative of said ambient temperature around said vehicle.

6. The method of claim 4 further comprising:
storing data indicative of a temperature difference between said temperature of said portion of the road over which said vehicle is being driven and said ambient temperature around said vehicle.

7. The method of claim 2 further comprising:
while operating said sensor equipment to collect data, operating vehicle positioning equipment located in said vehicle to determine a location of said vehicle.

8. The method of claim 7 further comprising:
storing data indicative of said vehicle position, wherein said data indicative of the thermal property of portions of said roads is associated with said data indicative of said vehicle position.

9. The method of claim 2 wherein said sensor equipment comprises a road composition sensor and wherein said method further comprises:
operating said road composition sensor to collect data indicative of a composition of said portion of the road over which said vehicle is being driven; and
storing said data indicative of a composition of said portion of the road over which said vehicle is being driven.

10. The method of claim 9 further comprising:
while operating said sensor equipment to collect data, operating vehicle positioning equipment located in said vehicle to determine a location of said vehicle; and
storing data indicative of said vehicle position, wherein said data indicative of said vehicle position is associated with said data indicative of a composition of said portion of the road over which said vehicle is being driven.

11. The method of claim 2 further comprising:
performing the steps of driving and operating when ambient conditions are favorable to detection of temperature differences between a portion of the road over which said vehicle is being driven and ambient air.

12. The method of claim 2 wherein said thermal property comprises thermal conductivity.

13. The method of claim 1 wherein said thermal property comprises thermal conductivity.

14. A system for collecting data indicative of a thermal property of roads for a geographic database comprising:
a vehicle equipped with sensor equipment responsive to the thermal property of a road surface upon which said vehicle is being driven;
a vehicle positioning system by which a location of said vehicle along said roads is determined; and
a data collection system located in said vehicle, wherein said data collection system is responsive to said sensor equipment and said vehicle positioning system, and wherein said data collection system includes a data storage device that stores data indicative of a thermal property of a surface of a road upon which said vehicle is being driven.

15. The system method of claim 14 wherein said sensor equipment comprises a first sensor that measures a temperature of a surface of said road over which said vehicle is located.

16. The system of claim 15 wherein said first sensor is surrounded by a hood that restricts interference from directions other than from said surface of said road.

17. The system of claim 15 wherein said first sensor comprises an infrared sensor.

18. The system of claim 14 wherein said sensor equipment includes a second sensor that collects data indicative of an ambient temperature around said vehicle.

19. The system of claim 14 wherein said sensor equipment includes a road composition sensor that collects data indicative of a composition of said portion of the road over which said vehicle is being driven.

20. The system of claim 19 wherein said road composition sensor is responsive to colors indicative of a composition of said portion of the road over which said vehicle is being driven.

21. A method of forming a geographic database comprising:
obtaining data indicative of roads including locations of said roads and thermal properties of said roads; and
forming the geographic database that contains data representing roads including locations of roads and thermal properties of said roads at specific locations.

22. The method of claim 21 wherein said step of obtaining further comprises:
comparing a thermal differential measured at said locations to a threshold to obtain said thermal properties of said roads.

23. A geographic database for use with a vehicle safety system that implements a safety procedure in a location of potential ice hazards, the geographic database comprising:
data indicating locations of roads; and
data indicating thermal properties at locations along said roads.

24. A safety system for a vehicle comprising:
a geographic database that contains data representing roads in a geographic area in which said vehicle is traveling and data indicating a thermal property of locations along said roads;
a vehicle positioning system that determines a current location of said vehicle on a road represented by said geographic database; and
an ice hazard application implemented on a computing device wherein said ice hazard application compares the current location of said vehicle to said data indicating the thermal property of locations along said roads and implements a safety procedure when said vehicle approaches a location at which said thermal property indicates a potential ice hazard.

25. The safety system of claim 24 wherein said safety procedure comprises a warning to a driver of the vehicle that the vehicle is approaching a location of a potential ice hazard.

26. The safety system of claim 24 wherein said safety procedure comprises modifying a speed of travel of the vehicle as the vehicle is approaching the location of a potential ice hazard.

27. The safety system of claim 24 further comprising:
a temperature sensor that measures an ambient temperature around the vehicle and provides an output indicative thereof, and
wherein said ice hazard application uses said output of said temperature sensor as a factor to determine whether an ice hazard potentially exists at a location.

28. A safety system for a vehicle comprising:
a geographic database;
programming that uses the geographic database to provide a safety procedure in a location of potential ice hazards; and
programming that uses the geographic database to provide at least one of: an additional safety procedure and navigation features.

* * * * *